(12) United States Patent
Rogowski et al.

(10) Patent No.: US 7,435,376 B2
(45) Date of Patent: Oct. 14, 2008

(54) COMPOSITES AND METHOD FOR MANUFACTURING SAME

(75) Inventors: Dirk Rogowski, Ebersbach a.d. Fils (DE); Ilka Lenke, Plochingen (DE); Dieter Theil, Esslingen/N (DE)

(73) Assignee: CeramTec AG, Plochingen (DE)

( * ) Notice: Subject to any disclaimer, the term of this patent is extended or adjusted under 35 U.S.C. 154(b) by 0 days.

(21) Appl. No.: 10/736,211

(22) Filed: Dec. 15, 2003

(65) Prior Publication Data

US 2004/0177943 A1 Sep. 16, 2004

(30) Foreign Application Priority Data

Dec. 20, 2002 (DE) ................ 102 59 993

(51) Int. Cl.
*B22F 3/26* (2006.01)
*B22D 17/00* (2006.01)

(52) U.S. Cl. ................ 419/5; 419/12; 419/13; 419/14; 419/19; 264/44; 264/645; 264/669; 164/97; 164/98

(58) Field of Classification Search ............ 419/5, 419/12–14, 19
See application file for complete search history.

(56) References Cited

U.S. PATENT DOCUMENTS

| | | | | |
|---|---|---|---|---|
| 3,362,818 A | * | 1/1968 | Schwarzkopf et al. | 419/2 |
| 4,108,670 A | * | 8/1978 | Steiger et al. | 501/96.3 |
| 4,224,128 A | * | 9/1980 | Walton | 204/247.3 |
| 5,234,045 A | * | 8/1993 | Cisko | 164/97 |
| 5,366,207 A | * | 11/1994 | Lin | 266/216 |
| 5,369,063 A | * | 11/1994 | Gee et al. | 501/82 |
| 5,511,603 A | * | 4/1996 | Brown et al. | 164/97 |
| 5,702,542 A | * | 12/1997 | Brown et al. | 148/406 |
| 5,900,277 A | * | 5/1999 | Fox et al. | 427/180 |
| 5,902,429 A | * | 5/1999 | Apte et al. | 156/89.28 |
| 6,036,792 A | * | 3/2000 | Chu et al. | 148/437 |
| 6,180,258 B1 | * | 1/2001 | Klier | 428/539.5 |
| 2001/0033038 A1 | * | 10/2001 | Sakaguchi et al. | 264/44 |

FOREIGN PATENT DOCUMENTS

| | | |
|---|---|---|
| DE | 197 08 402 C1 | 8/1998 |
| WO | WO-02/29139 A2 | 4/2002 |

OTHER PUBLICATIONS

Stolyarov—Processing nanocrystalline Ti and its nanocomposites from micrometer-sized Ti powder using high pressure torsion, Materials Science & Engineering. (Nov. 1999).
Ferkel, Magnesium strengthened by SIC nanoparticles, Materials Science & Engineering, (Jun. 2000).

* cited by examiner

*Primary Examiner*—Roy King
*Assistant Examiner*—Ngoclan T Mai
(74) *Attorney, Agent, or Firm*—Fulbright & Jaworski, L.L.P.

(57) ABSTRACT

A composite of a metal matrix with one or more incorporated secondary phases is referred to as a metal matrix composite (MMC). Secondary phase refers to all the particles or fibers which have a different composition than the metal matrix, and which are incorporated therein. As incorporation phases, elements and compounds are possible which, as a result of their material characteristics, are suited for improving individual properties of the metal matrix.

Besides an improvement in individual properties of the pure metal matrix as a result of the incorporated secondary phase, certain properties of the metal are also degraded, in particular by particles having a size of 1 to 50 µm. For example, the elongation at break decreases, the strength may decrease, or the tribology may become less favorable. The object of the invention is to improve the properties of the composites by an appropriate selection of the size and type of fibers and/or particles in the secondary phase, and/or the formation of a special pore structure in the preform.

32 Claims, No Drawings

COMPOSITES AND METHOD FOR MANUFACTURING SAME

This application claims priority from German Patent Application No: 102 59 993.9 filed Dec. 20, 2002 which is hereby incorporated by reference in its entirety.

The invention relates to composites and to a method for manufacturing same.

The term "composite," as used here, refers in particular to materials containing a metal as constituent, regardless of the percentage content. A metal matrix composite (MMC) refers to a compound of a metal matrix with one or more incorporated secondary phases. In the strictest sense, MMCs include only composites with a metal fraction $\geqq 50\%$ by volume. Composites with lower metal fractions are referred to as ceramic matrix composites (CMC), for example. However, in general this distinction is not consistently applied.

In the following description, "secondary phase" refers to all the particles or fibers which have a different composition than the metal matrix, and which are incorporated therein. Thus, the term "incorporation phase" is also used. The precipitation phases for alloys are not included under this term.

In principle, all metals may be considered as a metal matrix, in particular those from the group of "light metals" such as aluminum, magnesium, or titanium, for example. These light metals offer distinct weight advantages compared to conventional construction materials such as cast iron or steel, for example, and any disadvantages with respect to mechanical, tribological, or thermal properties may be compensated for in whole or in part by homogeneous incorporation of additional phases into the metal matrix.

As incorporation phases, elements and compounds may be used which, as a result of their material characteristics, are suited for improving individual properties of the metal matrix. This may be an improvement in the mechanical properties, such as for example strength, tribology, wear resistance, or elastic modulus. In other cases, an improvement in the thermal properties, such as an increase in the heat conductivity or decrease in the thermal expansion, for example, may be achieved. Furthermore, due to their composition, composites have favorable acoustic properties with respect to decreasing noise generation and sound conductance.

The homogeneous distribution of the secondary phases in the metal matrix may be achieved either by in situ formation during the manufacturing process, by mixing the secondary phase with the molten metal, or by infiltration of a porous molded body ("preform"), composed of the same material as the secondary phase, with the molten metal. The incorporation phases may be present as particles, fibers, or a mixture of both in the preform, and/or subsequently in the composite.

The preform technique is preferred for manufacturing composites because of the following advantages:

The molding process for the preform is independent of the molding of the component.

The preform is molded according to common powder technology methods such as axial pressing, isostatic pressing, slip casting, filtration casting, and extrusion, for example.

Molding of the composite in a contour-conforming manner is possible.

Local limitation of the composite to the functional ranges of the workpieces is possible.

A monolithic connection is formed between a local composite and the remainder of the structural element.

Combinations of different composites in one structural element are possible.

If needed, anisotropic orientation of the secondary phase in the composite is possible, thus enabling targeted influence of the component properties, in particular when fibers are used.

It is possible to manufacture gradient materials.

The composition of a composite is reproducible.

The following method steps for manufacturing a composite likewise have an effect on its quality:

Porosification:

For porosification of the preform, temporary fillers may be used, i.e., substances which may be removed from the preform by a thermal, chemical, or physical process step. A porous structure results which corresponds to the porosification agent with respect to proportion, size distribution, and shape. Natural or synthetic organic powders, for example, are used as porosification agents. Fibers may also be used for specific applications.

Infiltration:

For manufacturing a composite using the preform technique, the porous preform is infiltrated with a molten metal. To this end, known molding methods for metals are suitable, such as squeeze casting or die casting, for example. There are also methods designed especially for preform infiltration, such as direct press squeeze casting or gas pressure infiltration.

Controlled Reactions During Infiltration:

During the infiltration of a porous preform with a molten metal, material-influencing reactions can take place which, depending on the choice of the preform material and the metal alloy, may be used for chemical conversion of the composite composition and/or for modification of the composite properties. This includes for example the i3A method, in which titanium dioxide in the preform is reacted with the aluminum melt during infiltration, forming aluminum oxide and titanium aluminide. Such reactions may also be initiated in a subsequent, separate manufacturing step.

Possibilities for Modifying the Properties of the Metal Matrix:

As a rule, the properties of the metal matrix may be modified by the incorporated secondary phase in such a way that, depending on the volume fraction and the type of secondary phase, the composite properties may be qualitatively shifted in the range between the properties of the pure metal phase and those of the pure secondary phase.

By way of example, for a composite containing 50% by volume aluminum with a thermal expansion coefficient $\alpha$ approximately $24 \cdot 10^{-6}$ $K^{-1}$, and 50% by volume silicon carbide particles with $\alpha$ approximately $4 \cdot 10^{-6}$ $K^{-1}$, the resulting thermal expansion coefficient $\alpha$ is approximately $14 \cdot 10^{-6}$ $K^{-1}$.

Materials with the desired properties can be manufactured for many different types of applications over a broad range. The advantages of light metals can be combined with those of the incorporation phase, thereby compensating for specific disadvantages of the light metals used.

The current art is described in the following documents: WO 97/19774, U.S. Pat. Nos. 4,587,707, 4,916,030, 5,511,603, and 6,180,258.

Critique of the Current Art:

Particle Size:

Besides an improvement in individual properties of the pure metal matrix as a result of the incorporated secondary phase, certain properties of the metal are also degraded by particles having a size of 1 to 50 µm. For example, the elongation at break decreases, the strength may decrease, or the tribology may become less favorable.

Agglomeration:

The processing of nanoscale powders is possible as a dispersion in the aqueous phase only in extreme dilution and with the use of dispersing agents, since otherwise, agglomeration of particles results and the desired properties are lost.

In the processing of nanoparticles as a powder, in addition to handling problems there is also agglomeration, resulting in, for example, degraded properties due to structural defects in the composite.

Molding:

In the molding of the preform, nonhomogeneous distribution of the particles in the preform may result on account of demixing, agglomeration, or sedimentation. Such demixing occurs in particular for particles in the nanometer range. In addition, the molding methods often may lead to localized differences in compression, and thus to density gradients.

Pore Structure:

The pore structure of the preform is influenced essentially by the type of secondary phase and porosification agent, in particular by the particle size distribution and morphology. In this regard, the effects for molding, infiltration, and size of particles and fibers in the composite may counteract one another. Fine particles and fibers result in a fine pore structure, which may be beneficial for the composite but detrimental for infiltration.

Coarsening:

Solidification of the preform is a part of the molding process, and for ceramic hard materials in the secondary phase generally occurs by a sintering process. To achieve sufficient preform strength for handling and infiltration, depending on the hard material used the temperature must be selected to be high enough that a coarsening of the hard material particles results. In this manner the reinforcing effect, for example, is reduced. A rigid ceramic structure is also created, as the result of which the ductility of the metal matrix is lost. The coarsening of the hard materials is additionally benefited by the high sintering activity of fine particles in the nanometer range.

Preform Strength:

The combination of particles of a specified particle size distribution and morphology with a targeted volume fraction in the composite often results in only slight preform strength when the volume fraction of particles is low. The preform strength obtained, therefore, is generally not adequate for infiltration methods, such as die casting, performed in series.

Infiltration:

If the preforms are composed of very fine particles and fibers in the nanometer range, or contain a high volume fraction of particles or fibers, for infiltration with a molten metal special methods must be used to achieve complete infiltration. These include, for example, gas pressure infiltration or direct press squeeze casting. Economical mass production methods such as die casting, for example, are generally not possible.

Reactions:

A large number of elements and compounds must be excluded as secondary phase materials for production of the preform because they enter into undesired, undefined, or uncontrolled reactions during infiltration with the molten metal.

Machinability:

The secondary phases with their desired property improvements, introduced into the composite using the preforms, also frequently result in undesired degradation of machinability. This can result in machining defects in the form of cracks or eruptions, longer machining times, and increased tool wear, and thus higher costs.

Properties:

The incorporation of relatively coarse particles in the secondary phase into the metal matrix may result in a decrease in favorable, and, for certain applications, desired, properties of the metals, such as a decrease in elongation or ductility. The rigid ceramic structure of the preform may also contribute to the impairment of properties.

The object of the invention is to improve the properties of the composites by an appropriate selection of the size and type of fibers and/or particles in the secondary phase, and/or the formation of a special pore structure in the preform.

The invention has an effect on the following parameters:

Particle Size:

As previously described, the size of the particles used as the secondary phase for manufacturing a composite affect the composite properties. Surprisingly, when particles in the nanometer range of 5 to 500 nanometers (also referred to as nanoparticles) are used, this effect increases exponentially compared to the effect of particles in the size range between 1 and 50 micrometers. A prerequisite is that the particles are present also in the composite as separate, non-agglomerated particles.

It has also been found that the macroscopic properties of the substances of which the nanoparticles are composed do not necessarily have to be consistent with their effects in the composite. For example, nanoparticles having a relatively low intrinsic hardness, such as titanium dioxide or silicates, notably increase the hardness of a composite. This effect, referred to as dispersion strengthening, results from influencing the metallic structure.

In addition to the exclusive use of nanoparticles as the secondary phase with fractions of 20% to 80% by volume in the composite, additional secondary phases in the form of coarse particles and/or fibers may be simultaneously used.

Agglomeration:

To make use of the beneficial effects of the nanoparticles, it is necessary that they be kept as separate particles and that agglomeration be prevented. In the invention it was surprisingly found that, by the defined precipitation of nanoparticles onto other particles which function as substrates, or onto additional secondary phases or porosification agents, it is possible to perform processing even as a powder without resulting in undesired agglomeration.

Molding:

To avoid demixing between the secondary phase and the porosification agent, the nanoparticles in the secondary phase are either directly precipitated onto the preformed porosification agent or are produced in the preform, for example by a sol gel process. This results directly in a preform containing nanoparticles.

Furthermore, pretreated nanoparticles may be fixed onto other nanoparticles as well as on or in the porosification agent. To this end, spray granulation using an atomizer, for example, is suitable, or a method for dry mixing and/or progressive granulation, using for example a granulating drum, fluidized bed, or the like. By the suitable choice of the sequence in which constituents and auxiliary agents are added, and of the thermal and mechanical boundary conditions, a granulate is obtained which may be processed by customary molding methods.

The granulation process creates a negative image of the porosification agent, and thus of the pore structure in the shape of the nanoparticles in the secondary phase. The structure of the secondary phase is reciprocally as well as fractally (self-similarly) constituted, as is the pore structure.

Pore Structure:

A multimodal pore structure was developed for the infiltration of preforms. This is understood to be a tree-like structure of the pore channels, and is reflected in the configuration of the metal structure according to the infiltration. A fractal (self-similar) structure is formed over several orders of magnitude in the microscopic range. It is thus possible to markedly lower the infiltration resistance due to pore channels which would otherwise be too narrow. Nevertheless, the number of coarse metal-filled pores is not great enough to impair the properties of the composite. The method allows the production even of preforms, with small particles down to the nanometer range and high solid fractions, which can be still be infiltrated using die casting.

The pore structure is formed firstly from temporary organic porosification agents which are removed from the preform during a special process step and which result in pores corresponding with respect to quantity, size, and shape. Secondly, pores are introduced into the preform by the molding process, using processed granulate.

It is therefore important to coordinate the porosification agent used and the manufacturing of the granulate in such a way that the desired multimodal pore structure is formed. As porosification agent it is advantageous to use a mixture of different substances which differ in size distribution, shape, and structure. Suitable are natural organic substances such as starches, cellulose, and other substances of vegetable origin, for example, having particle sizes between 1 and 500 micrometers. However, synthetic substances such as wax and other polymers with an appropriate structure are also suitable.

Coarsening:

Precipitation of an inorganic binder during molding, using a sol gel process, for example, on the particles in the secondary phase and/or in the porosification agent results in sufficient solidification of the preform at temperatures considerably lower than 1000° C., and coarsening, in particular of the reactive nanoparticles, does not occur.

Preform Strength:

For many hard materials, the previously referenced solidification of the preform by heat treatment following the molding process is achieved by forming bridges between the particles. This first occurs where particles are already in contact.

The number of contact points can be increased considerably by adding particles having dimensions in the nanometer range. In addition, the nanoparticles are more reactive, so that the bridge formation occurs at lower temperatures. Only thinner bridges are formed, on account of the large number of contact sites. This increases the ductility and expansibility of the composite.

Infiltration:

According to the invention, manufactured preforms can also be infiltrated in serial methods, for example the squeeze casting or die casting method, on account of their fractal, tree-like pore structure and configuration of the hard material particles or fibers.

Reactions:

Pretreatment of the nanoparticles allows the composite structure to be influenced, and reactions with the metal matrix to be controlled, i.e., initiated or suppressed, in a targeted manner during infiltration or during a subsequent process step.

Machinability:

The use of nanoparticles according to the invention allows the properties of the composite to be improved, even with low volume fractions of secondary phases. An increase in strength can be achieved using smaller quantities of hard substances, for example titanium dioxide, so that the machinability is significantly easier than with conventional composites.

Properties:

The combination of small particle size, the pore structure formed, the microstructure in the composite, and specialized binding of the particles in the preform allows the disadvantages in composites occurring with the use of coarser particles to be significantly reduced. The decrease in favorable metallic properties is slight, and the machinability is good.

ADVANTAGES OF THE INVENTION

The use of particle sizes in the nanometer range (5 to 500 nanometer) enables the properties of the composites to be significantly improved, and the disadvantages occurring with coarser particles to be minimized. Considerably smaller quantities of particles in the nanometer range are necessary to realize the same effect as that obtained using coarser particles in the customary range of 1 to 50 micrometers, such as the increase in hardness with substances having a relatively low hardness, for example.

The particle pretreatment carried out according to the invention allows the composite structure to be influenced. The integration of the secondary phase into the metal matrix can be adjusted. In addition, reactions of the secondary phase with the metal matrix can be controlled, initiated, or suppressed in a targeted manner during the infiltration or during a subsequent process step.

The inventive pore channel structure of the preform in the form of a tree structure enables the infiltration resistance to be reduced, even for unfavorable combinations of particle size distribution, shape, and volume fraction. Thus, conventional mass production methods such as die casting, for example, may be used for infiltration with molten metals.

The invention is explained in greater detail with reference to exemplary embodiments:

EXAMPLE 1

| | |
|---|---|
| 36.0 wt % | $Al_2O_3$, nanoscale powder |
| 5.0 wt % | Cellulose powder |
| 5.0 wt % | Starch powder |
| 3.5 wt % | Dispersing agent |
| 0.5 wt % | Organic binder |
| 50.0 wt % | Water |

The constituents were placed in a rotary mill, having identical-weight milling balls made of ceramic and with a diameter 12 mm, so that the mill was filled to approximately 50% capacity, and were ground for 3 hours.

The resulting slurry was poured out onto metal plates in layers approximately 5 mm thick, frozen, and then freezedried. The dry mixture was passed through a 630 μm-mesh sieve to obtain a homogeneous, fine powder.

For molding, 120 g of the powder was axially pressed in a mold with dimensions of 125 mm×60 mm, at 100 MPa. A plate was obtained having the above-referenced dimensions, with a height of approximately 10 mm and a density of 1.63 g/cm$^3$.

The plate was heated in air at a rate of about 100 K/hr to 600° C., held at 600° C. for one hour, and then cooled. The plate obtained had a density of 1.16 g/cm$^3$, corresponding to a porosity of approximately 70%. The plate was solid, and could be sawed into small pieces.

These pieces were heated to approximately 600° C., placed in a suitable metal mold, and infiltrated with aluminum in a squeeze casting process. A composite of aluminum having a fraction of approximately 30% by volume nanoscale $Al_2O_3$ particles was obtained.

EXAMPLE 2

| | |
|---|---|
| 43.5 wt % | $Al_2O_3$, nanoscale powder |
| 2.5 wt % | Cellulose powder |
| 2.5 wt % | Starch powder |
| 0.7 wt % | Dispersing agent |
| 0.8 wt % | Organic binder |
| 50.0 wt % | Water |

The water was placed in a container, and the remaining constituents were homogeneously dissolved or dispersed therein using a high-speed stirrer. The slurry was then spray-dried, using an atomizer, to produce a granulate.

For molding, as an example 6000 g of the granulate may be axially pressed in a mold with dimensions of 400 mm×250 mm, at 100 MPa. A plate was obtained having the above-referenced dimensions, with a height of approximately 30 mm and a density of 2.01 g/cm$^3$.

The plate was heated at a rate of about 50 K/hr in air to 800° C., held at 800° C. for one hour, and then cooled. The plate obtained had a density of 1.68 g/cm$^3$, corresponding to a porosity of approximately 58%. The plate was solid, and could be sawed into small pieces.

These pieces were heated to approximately 700° C., placed in a suitable metal mold, and infiltrated with aluminum in a die casting process. A composite of aluminum having a fraction of approximately 42% by volume nanoscale $Al_2O_3$ particles was obtained.

EXAMPLE 3

| | |
|---|---|
| 43.5 wt % | $Al_2O_3$, nanoscale powder |
| 3.3 wt % | Cellulose powder |
| 1.7 wt % | Lignin powder |
| 0.7 wt % | Dispersing agent |
| 0.8 wt % | Organic binder |
| 50.0 wt % | Water |

The preparation, molding, and solidification proceeded as in Example 2. A plate was obtained having a pressing density of 1.99 g/cm$^3$ and a final density of 1.65 g/cm$^3$, corresponding to a porosity of approximately 59%.

The pieces sawed from this plate were heated to approximately 700° C., placed in a suitable metal mold, and infiltrated with aluminum in a die casting process. A composite of aluminum having a fraction of approximately 41% by volume nanoscale $Al_2O_3$ particles was obtained.

In the characterization of the mechanical properties of this composite in Example 3, four-point bending strengths of greater than 650 MPa and elongation values of greater than 0.7% were obtained.

EXAMPLE 4

For molding, 6000 g of a granulate prepared according to Example 3 was axially pressed in a mold having dimensions of 400 mm×250 mm, at 100 MPa. A plate was obtained having the above-referenced dimensions, with a height of approximately 30 mm and a density of 2.01 g/cm$^3$.

The plate was heated at a rate of about 50 K/hr in air to 600° C., held at 600° C. for one hour, and then cooled. The low sintering temperature was chosen to minimize coarsening and excessive fusion of the nanoscale particles. The plate obtained had a density of 1.59 g/cm$^3$, corresponding to a porosity of approximately 60%. Because of the low sintering temperature, the plate was not yet solid enough for problem-free handling or for the infiltration process.

Using a sol gel process, the preform was impregnated with an alkaline colloidal solution of titanium oxide hydroxide ($TiO(OH)_2$), then dried and subjected to heat treatment at 600° C. The plate then had sufficient strength, and could be sawed into small pieces and infiltrated as in Example 2.

EXAMPLE 5

| | |
|---|---|
| 34.5 wt % | $TiO_2$, microscale powder |
| 10.0 wt % | $TiO_2$, nanoscale powder |
| 3.0 wt % | Cellulose powder |
| 1.5 wt % | Lignin powder |
| 0.2 wt % | Dispersing agent |
| 0.8 wt % | Organic binder |
| 50.0 wt % | Water |

The water was placed in a container, and the remaining constituents were homogeneously dissolved or dispersed therein using a high-speed stirrer. The slurry was then spray-dried to produce a granulate, using an atomizer.

For molding, 6000 g of the granulate was axially pressed in a mold with dimensions of 400 mm×250 mm, at 100 MPa. A plate was obtained having the above-referenced dimensions, with a height of approximately 30 mm and a density of 1.91 g/cm$^3$.

The plate was heated at a rate of about 50 K/hr in air to 1100° C., held at 1100° C. for one hour, and then cooled. The plate obtained had a density of 1.83 g/cm$^3$, corresponding to a porosity of approximately 57%. The plate was solid, and could be sawed into small pieces and infiltrated as in Examples 2 and 3.

EXAMPLE 6

| | |
|---|---|
| 33.5 wt % | $TiO_2$, microscale powder |
| 10.0 wt % | $TiO_2$, nanoscale powder |
| 3.0 wt % | Cellulose powder |
| 1.5 wt % | Lignin powder |
| 0.2 wt % | Dispersing agent |
| 0.8 wt % | Organic binder |

-continued

| | |
|---|---|
| 1.0 wt % | Copper sulfate hydrate |
| 50.0 wt % | Water |

The water was placed in a container, and the remaining constituents were homogeneously dissolved or dispersed therein using a high-speed stirrer. The slurry was then spray-dried to produce a granulate, using an atomizer.

The copper sulfate hydrate was added for pretreatment or coating of the titanium dioxide to increase the activity during sintering and infiltration.

For molding, 6000 g of the granulate was axially pressed in a mold with dimensions of 400 mm×250 mm, at 100 MPa. A plate was obtained having the above-referenced dimensions, with a height of approximately 30 mm and a density of 1.90 g/cm$^3$.

The plate was heated at a rate of about 50 K/hr in air to 800° C., held at 800° C. for one hour, and then cooled. Due to the addition of copper sulfate hydrate the plate obtained, in spite of the lower sintering temperature that was lower than that of Example 5 by 300K, unexpectedly had a density of 1.86 g/cm$^3$, corresponding to a porosity of approximately 56%. The plate was as solid as in Example 5, and could be sawed into small pieces and infiltrated as in Examples 2 and 3.

The invention claimed is:

1. A method comprising:
admixing at least one secondary phase having a particle size with a porosity agent and an organic binding agent to form a mixture;
shaping the mixture in a mold to form a green body;
heating said green body to remove the porosity agent and to harden and solidify the green body to yield a porous green body having a multimodal structure formed by the removed porosity agent; and
infiltrating the multimodal pore structure of the porous green body with a molten metal to produce a metal matrix composite;
wherein said at least one secondary phase is selected from the group consisting of a metal, an oxide, a carbide, a nitride, a boride and a silicide;
wherein said molten metal is selected from the group consisting of aluminum, aluminum alloy, magnesium, magnesium alloy, titanium and titanium alloy;
wherein the particle size of said at least one secondary phase is from 5 to 500 nanometers, and wherein a polyform structure is produced in the composite which is an image of the tree-like structure of the porosifying agent that is produced by a combination of various granulation processes.

2. The method according to claim 1, wherein said particle size of at least a second additional secondary phase is in the range of 1 to 50 microns.

3. The method according to claim 1, wherein the porosification agent is organic.

4. The method according to claim 3, wherein at least two different porosification agents which differ in size and morphology are added to said matrix.

5. The method according to claim 3, wherein the secondary phase comprises an oxide.

6. A method according to claim 1, wherein the secondary phase is deposited on a coarser secondary phase or on the porosification agent, by a granulation process.

7. The method according to claim 1, wherein the porosification agent is heated at a temperature that will not sinter the green body.

8. The method according to claim 1, wherein the infiltration of the molded body is carried out using infiltration methods.

9. The method according to claim 1, wherein, the molded body is mechanically machined.

10. The method of claim 8, wherein said infiltration is gas pressure infiltration or die casting.

11. The method according to claim 1, wherein said at least one secondary phase is in particulate or fiber form.

12. A method comprising:
admixing at least one secondary phase having a particle size with a porosity agent and an organic binding agent to form a mixture;
shaping the mixture in a mold to form a green body;
heating said green body to remove the porosity agent and to harden and solidify the green body to yield a porous green body having a multimodal structure formed by the removed porosity agent; and
infiltrating the multimodal pore structure of the porous green body with a molten metal to produce a metal matrix composite;
wherein said at least one secondary phase is selected from the group consisting of a metal, an oxide, a carbide, a nitride, a boride and a silicide;
wherein said molten metal is selected from the group consisting of aluminum, aluminum alloy, magnesium, magnesium alloy, titanium and titanium alloy;
wherein the particle size of said at least one secondary phase is from 5 to 500 nanometers, and wherein a polyform structure is produced in the composite which is an image of the tree-like structure of the porosifying agent that is produced by a combination of various granulation processes further comprising adding to the matrix at least two coordinated organic binders, wherein said at least two coordinated organic hinders have different coordinated solubilities.

13. A method comprising:
admixing at least one secondary phase having a particle size with a porosity agent and an organic binding agent to form a mixture;
shaping the mixture in a mold to form a green body;
heating said green body to remove the porosity agent and to harden and solidify the green body to yield a porous green body having a multimodal structure formed by the removed porosity agent; and
infiltrating the multimodal pore structure of the porous green body with a molten metal to produce a metal matrix composite;
wherein said at least one secondary phase is selected from the group consisting of a metal, an oxide, a carbide, a nitride, a boride and a silicide;
wherein said molten metal is selected from the group consisting of aluminum, aluminum alloy, magnesium, magnesium alloy, titanium and titanium alloy;
wherein the particle size of said at least one secondary phase is from 5 to 500 nanometers, and wherein a polyform structure is produced in the composite which is an image of the tree-like structure of the porosifying agent that is produced by a combination of various granulation processes wherein the secondary phase with particles in the nanometer range is formed out directly in the molded body on an additional, coarser secondary phase or on the porosification agent.

14. The method of claim 12, wherein the at least one secondary phase is pretreated by coating particles of the at least one secondary phase with a sol-gel process.

15. A method comprising:
- admixing at least one secondary phase having a particle size with a porosity agent and an organic binding agent to form a mixture;
- shaping the mixture in a mold to form a green body;
- heating said green body to remove the porosity agent and to harden and solidify the green body to yield a porous green body having a multimodal structure formed by the removed porosity agent; and
- infiltrating the multimodal pore structure of the porous green body with a molten metal to produce a metal matrix composite;
- wherein said at least one secondary phase is selected from the group consisting of a metal, an oxide, a carbide, a nitride, a boride and a silicide;
- wherein said molten metal is selected from the group consisting of aluminum, aluminum alloy, magnesium, magnesium alloy, titanium and titanium alloy;
- wherein the particle size of said at least one secondary phase is from 5 to 500 nanometers, and wherein a polyform structure is produced in the composite which is an image of the tree-like structure of the porosifying agent that is produced by a combination of various granulation processes wherein at least one secondary phase is pretreated by coating the particles using a chemical process.

16. The method of claim 15, wherein said chemical process is a sol-gel process.

17. The method of claim 15, wherein the at least one secondary phase is precipitated or formed in the preform on an additional, coarser secondary phase or on the porosification agent.

18. The method of claim 15, wherein said at least one secondary phase is deposited on at least one of a coarser secondary phase or on the porosification agent using a granulation process.

19. The method of claim 18, wherein said infiltration is a gas pressure infiltration process.

20. A method for the manufacture of composite material for the production of molded bodies comprising depositing one or more secondary phases of metals, oxides, carbides, borides, nitrides, silicides as well as combinations thereof in a matrix of the metals, aluminum, magnesium, titanium and alloys thereof with other metals, and incorporating a porosification agent, wherein the particle size of at least one secondary phase ranges from 5 to 500 nanometers, and the depositing of the secondary phase is on at least one of a coarser secondary phase or on the porosifying agent and is performed by spray granulation.

21. A method according to claim 20, further consisting adding at least one secondary phase of particles in a size of from 1 to 50 microns.

22. A method according to claim 20, wherein only 20 to 80 vol % of the at least one secondary phase having a particle size of from 5 to 500 nanometers is added.

23. A method according to claim 20, wherein at last two organic binding agents with specified different solubilities are added to the composite to assist the granulate preparation and shaping are used.

24. A method according to claim 23, wherein the organic binding agent is a polymer.

25. A method according to claim 23, wherein the organic binding is polyvinyl alcohol.

26. A method according to claim 20, wherein the porosifying agent is organic.

27. A method according to claim 26, wherein the organic porosifying agent is selected from the group consisting of a starch, cellulose, and a polymer.

28. A method according to claim 26, wherein the porosifying agent has a particle size of 1 μm to 500 μm.

29. A method according to claim 26, wherein at least two porosifying agents of different size and morphology are incorporated.

30. A method comprising:
- admixing at least one secondary phase with a porosity agent to form a mixture and shaping the mixture in a mold to form a green body;
- heating said green body to remove the porosity agent and to harden and solidify the green body to yield a porous green body;
- infiltrating the heated porous green body with a molten metal to produce a metal matrix composite; and adding to the matrix at least two coordinated organic binders, wherein said at least two coordinated organic binders have different coordinated solubilities
- wherein said at least one secondary phase is selected from the group consisting of a metal, an oxide, a carbide, a nitride, a boride and a silicide;
- wherein said molten metal is selected from the group consisting of aluminum, aluminum alloy, magnesium, magnesium alloy, titanium and titanium alloy;
- wherein the particle size of said at least one secondary phase is from 5 to 500 nanometers, wherein said porous green body has pores that form a self-similar pore structure produced by the formation of multimodal, tree-like structure of the porosification agent by a combination of various granulation processes.

31. The method according to claim 30, further comprising adding an organic porosification agent to said matrix wherein at least two different porosification agents which differ in size and morphology are added to said matrix.

32. A method comprising:
- admixing at least one secondary phase with a porosity agent and optionally an organic biding agent to form a mixture and shaping the mixture in a mold to form a green body;
- heating said green body to remove the porosity agent and to harden and solidify the green body to yield a porous green body; and
- infiltrating the heated porous green body with a molten metal to produce a metal matrix composite;
- wherein said at least one secondary phase is selected from the group consisting of a metal, an oxide, a carbide, a nitride, a boride and a silicide;
- wherein said molten metal is selected from the group consisting of aluminum, aluminum alloy, magnesium, magnesium alloy, titanium and titanium alloy;
- wherein the particle size of said at least one secondary phase is from 5 to 500 nanometers, wherein said porous green body has pores that form a self-similar pore structure produced by the formation of multimodal, tree-like structure of the porosification agent by a combination of various granulation processes wherein at least one secondary phase is pretreated by coating the particles using a sol-gel process.

* * * * *